June 10, 1930.  E. W. ROBERTS  1,762,195
GAS COCK
Filed March 12, 1928
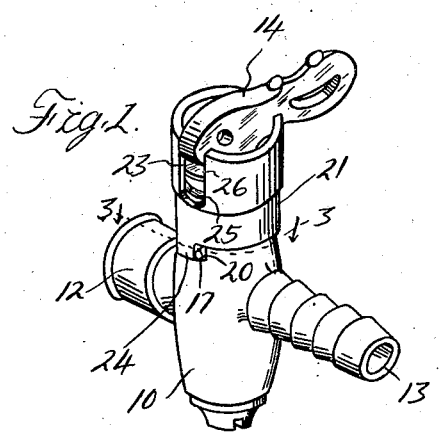
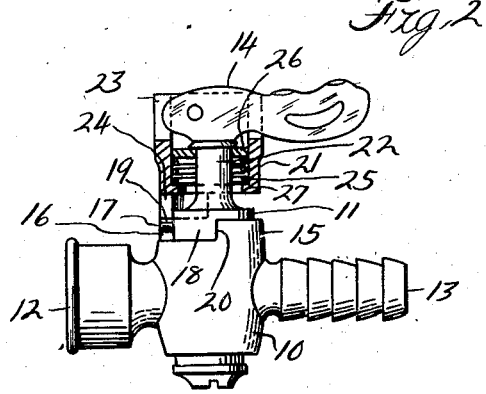
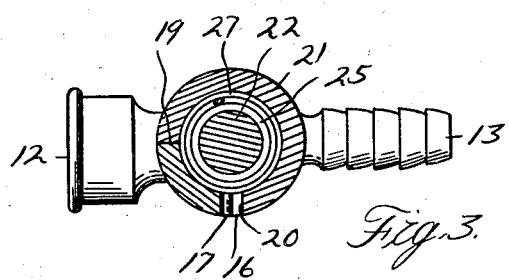
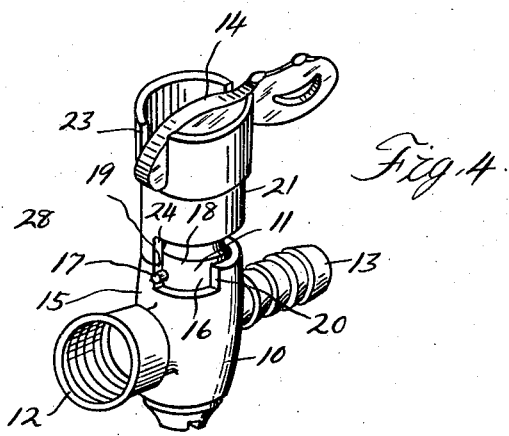
Inventor
Earl W. Roberts Patented June 10, 1930

1,762,195

UNITED STATES PATENT OFFICE

EARL W. ROBERTS, OF DETROIT, MICHIGAN, ASSIGNOR TO ROBERTS BRASS MANUFACTURING COMPANY, OF DETROIT, MICHIGAN, A CORPORATION OF MICHIGAN

GAS COCK

Application filed March 12, 1928. Serial No. 261,162.

This invention relates to latch constructions for valves such as gas cocks and the like, and has among its objects to simplify, render more efficient and improve generally devices of this character.

One of the primary objects of the present invention is to provide a valve having a rotatable valve plug with a latch which automatically operates to retain the plug in closed position so as to prevent accidental opening thereof.

To this end the invention contemplates a latch construction which may be quickly and economically manufactured in large quantities, and which may be assembled with facility with the gas cock or other valve.

The several objects, advantages and novel details of construction of this invention will be made more apparent as this description proceeds, especially when considered in connection with the accompanying drawings wherein, Figure 1 is a perspective view of a valve provided with a lock or latch constructed in accordance with my invention, Figure 2 is a side elevation partly in section showing the position of the parts when the valve is open, Figure 3 is a sectional view taken on the plane indicated by the line 3—3 of Figure 1, and Figure 4 is a view similar to Figure 1 showing the valve in open position.

Referring now to the drawings, wherein like reference characters indicate corresponding parts, it will be noted that there is illustrated a valve casing 10 having a rotary valve plug 11 provided with a valve opening adapted to be brought into registration with the inlet and outlet openings 12 and 13 respectively, formed in the casing 10. In the illustrative embodiment of the invention herein shown, the valve plug preferably terminates at the upper end thereof in a lateral extension 14, which in the present instance constitutes an operating handle for the plug.

To provide an efficient construction and to limit the extent of rotation of the plug 11, within the casing 10, the tubular portion 15 of the latter is provided with a cutaway portion or slot 16 arranged to receive a pin 17 projecting from the body portion 18 of the plug. The dimension of the slot 16 is such that when the projection 17 is in engagement with the wall 19 of the slot, the opening in the plug 11 will be in registration with the inlet and outlet openings 12 and 13 respectively, or in other words, the valve will be in open position. On the other hand, when the projection 17 is in engagement with the wall 20 of the slot as illustrated in Figure 1, the opening in the plug will be out of registration with the inlet and outlet openings aforesaid, and the valve will be in closed position.

In order to positively hold the valve in closed position, I provide the sleeve 21, which as shown surrounds the shank portion 22 of the plug and is slotted as at 23 for receiving the handle portion 14. With this arrangement, it will be noted that the plug and sleeve 21 may be rotated as a unit for opening or closing the valve. The sleeve 21 is also provided with a depending lug 24 arranged in the closed position of the valve to engage the wall 19 of the slot 16 and the projection 17 of the plug, so as to prevent further rotation of the latter. Arranged within the sleeve 21 is a suitable coil spring 25 having one end engageable with a split washer 26 positioned upon the shank portion 22 of the plug and the opposite ends engaging an annular flange 27 extending inwardly from the sleeve 21, the arrangement being such that the spring tends to urge the sleeve downwardly into locking engagement with the casing. It will be seen that the washer 26 not only functions as an abutment for one end of the spring 25 but also serves as a guiding device for the sleeve 21 during the sliding movement thereof.

In assembling the parts, the split washer 26 is slipped upon the shank 22 so as to engage the handle 14. The sleeve 21 together with the coil spring 26 is then slid over the body portion 15 of the plug as a unit until the slots 23 receive the handle portion 14 of the plug substantially as shown in Figure 1 of the drawings. The pin 17 is then secured to the plug and the latter is fastened within the tubular portion 15 of the casing with the pin 17 arranged in the slot 16 formed in the casing.

In operation, when it is desired to open the valve, the operator merely lifts the sleeve 21 upwardly against the action of the spring 25 until the depending projection 24 assumes a position above the wall 19 of the slot 16. The plug is then rotated and the pin 17 engages the wall 19, at which time the opening in the plug is in registration with the inlet and outlet openings 12 and 13 of the casing. Upon rotating the plug in the reverse direction to close the valve, the projection 24 will ride along the top surface 28 of the tubular portion 15 of the casing until the pin 17 engages the wall 20 of the slot 16. The projection 24 will then automatically snap into engagement with the slot 16 filling the space between the pin 17 and wall 19, thereby locking the valve in closed position.

The simplicity of the device which facilitates its manufacture in great quantities, and its easy assembling will be obvious without further description, it being also obvious that the latch as a unit may be connected to the valve plug with the employment of additional fastening means, such as bolts, rivets or the like.

While the embodiment of the invention herein described and illustrated somewhat in detail, has been found to give entirely satisfactory results in practice, it will nevertheless be obvious that various changes may be made in the essential and all of the non-essential details and hence reservation is made to make such changes as may come within the purview of the accompanying claims.

What I claim as my invention is:

1. In a valve, a casing, a plug rotatable in said casing, a handle carried by said plug and having portions projecting beyond opposite sides thereof, a tubular member loosely and slidably mounted upon said plug between said handle and casing, said tubular member being provided with a pair of aligned slots receiving the projecting portions of said handle whereby the plug and tubular member are rotated as a unit, a disk-like element mounted upon said plug and positioned within and engaging the inner wall of said tubular member, and a yieldable member having one end engaging said element and the opposite end engaging a portion of said tubular member for automatically moving said tubular member into locking engagement with the casing when the plug is in closed position.

2. In a valve, a casing, a plug rotatable in said casing, a sleeve movable longitudinally of said plug into and out of engagement with said casing, means for moving said sleeve when said plug reaches a predetermined position of rotation relative to said casing, and an abutment for said means constituting a guide for said longitudinally movable sleeve.

3. In a valve, a casing, a plug rotatable in said casing, a sleeve movable longitudinally of said plug into and out of engagement with said casing, a spring surrounding said plug and adapted to move said sleeve longitudinally of said plug when the latter reaches a predetermined position of rotation relative to said casing, and a washer on said plug constituting an abutment for the spring and a guide for the sleeve.

4. In a valve, a casing, a plug rotatable in said casing and having a part projecting beyond one end of the casing, a handle carried by the projecting part of said plug and having portions projecting laterally beyond opposite sides of the projecting part, a sleeve slidably mounted upon said projecting part, having one end adapted to have locking engagement with said casing, and provided at its other end with a pair of aligned slots that permanently receive the projecting portions of said handle whereby the plug and sleeve may be rotated as a unit, and yieldable means within said sleeve for moving said sleeve longitudinally of the projecting part aforesaid into locking engagement with said casing when the plug is in a predetermined position of rotation relative to said casing.

In testimony whereof I affix my signature.

EARL W. ROBERTS.